June 10, 1958  N. SPRINGATE  2,838,080
PULP WOOD CHIPPER FEEDS
Filed June 13, 1955
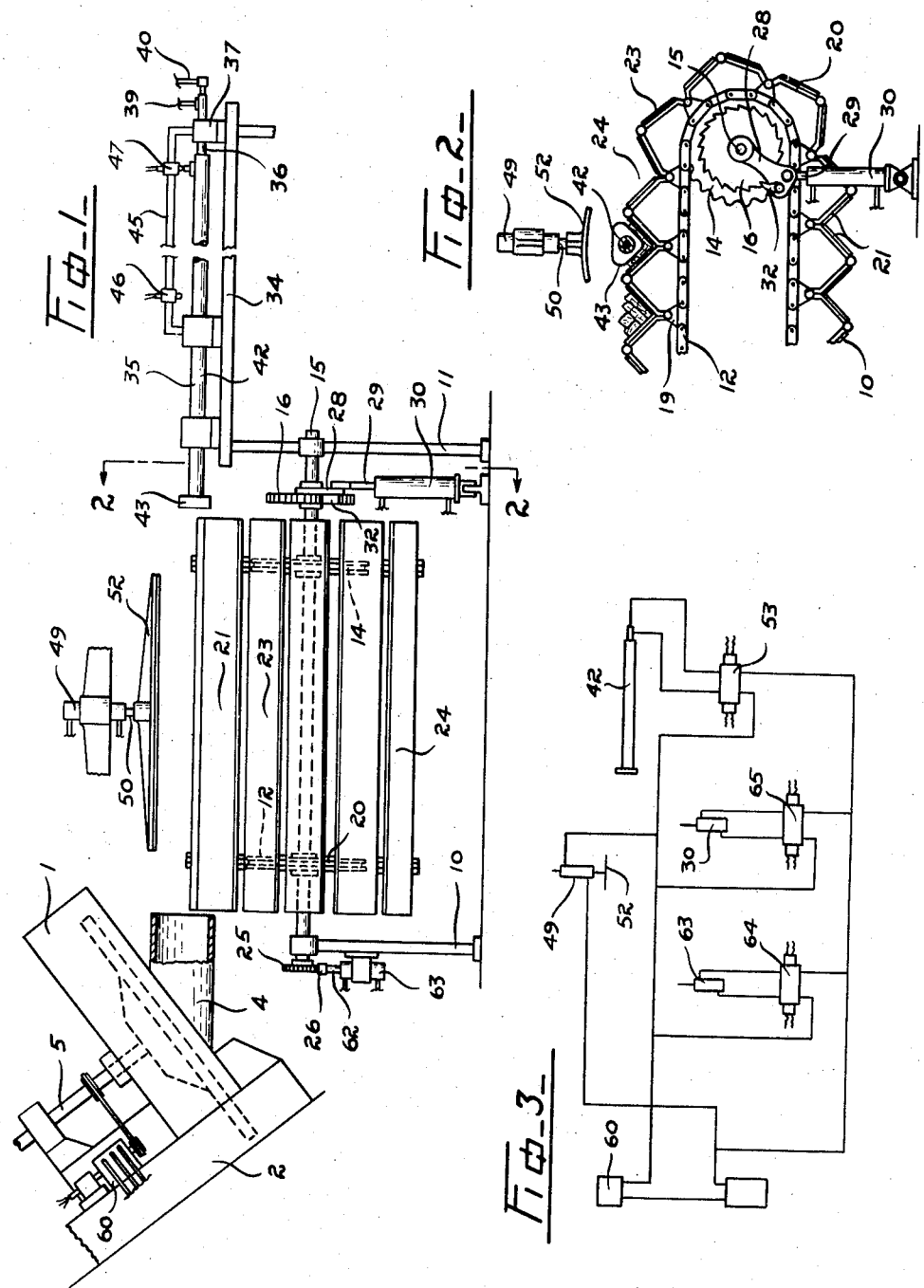
INVENTOR
NORMAN SPRINGATE
ATTORNEY

United States Patent Office 2,838,080
Patented June 10, 1958

2,838,080
PULP WOOD CHIPPER FEEDS

Norman Springate, Burnaby, British Columbia, Canada, assignor to Canadian Forest Products Ltd., Vancouver, British Columbia, Canada Application June 13, 1955, Serial No. 515,159

3 Claims. (Cl. 144—242)

My invention relates to improvements in pulp wood chipper feeds.

The objects of the present invention are to provide means for utilizing short length pieces of log or dimension lumber for the production of pulp chips; to provide means whereby short irregular length material can be cut into pulp chips without producing an inordinate amount of undersize chips or waste which has to be removed, and to provide means whereby many relatively thin pieces may be fed as a body into the feed shoe of the chipper.

Further objects are to provide a feed means which will advance the wood to be cut towards the chipper knives at a constant speed and with a constant thrust, and to prevent any bouncing or rearward movement of said wood or logs.

A further object is to provide a condition due to the feed of wood to the chipper knives whereby said knives will remain in good cutting condition for a greater length of time than heretofore.

A still further object is to provide means whereby the rate of feed of material to the chipper knives will change automatically with the speed of rotation of said knives.

Referring to the accompanying drawings:

Figure 1 is a front elevational view of the invention.

Figure 2 is a transverse sectional view taken on the line 2—2 of Figure 1.

Figure 3 is a diagrammatic view of a means for controlling the various feed movements.

In the drawings like characters of reference indicate corresponding parts in each figure.

The numeral 1, see Figure 1, indicates a conventional disk chipper mounted on an inclined base 2 so that its feed shoe 4 is disposed horizontally. The chipper is provided with a disk shaft 5 which is adapted to be direct connected to an electric motor, not shown, for driving the disk and its cutting knives to cut material fed into the shoe 4. The equipment above described is well known, except that it is inclined for the material to be received into the feed shoe while moving along a horizontal path instead of being allowed to slide down an inclined path by gravity and be agitated in the feed shoe whereby the weight of the wood is thrown violently to one side of the shoe, frequently causing damage to the knives and impairing the quality of chips produced.

A feeder generally indicated by the numeral 10 is disposed in close proximity to the feed shoe 4 of the chipper. The feeder 10 consists of a frame 11 which is adapted to support a pair of endless conveyor chains 12, one only shown. The chains are trained over sprockets 14 to provide an upper and a lower conveyor run. The sprockets 14 are appropriately mounted upon shafts 15, one only shown, and one of said sprockets is provided adjacent its outer end with a ratchet wheel 16. The pair of chains 12 support hinge brackets 19 spaced apart and secured to each chain and elongated links 20 which are hingedly connected in pairs, see Figure 2, to each hinge bracket, so as to form V-shaped members 21. The free ends of each pair of links 20 of a V-shaped member 21 are hingedly connected to adjacent links of other members and elongated side plates 23 connect pairs of the links 20 and extend therebeyond to form channels or feed pockets 24, see Figures 1 and 2. The V-shaped members 21 and their side plates are obviously maintained in V formation as shown in Figure 2, when disposed in or forming part of the upper or lower run of the chains and are adapted to collapse to a lesser overall height as they reach and move around the sprockets 14 from one run to another. One of the shafts 15 is fitted with a notched wheel 25 which is adapted to be engaged on its periphery by a vertically movable dog 26 to hold the chains 12 from moving when one of the feed channels 24 is in register with the feed shoe 4 of the chipper 1.

Swingingly mounted upon the shaft 15 in close proximity to the ratchet wheel 16, is a crank 28 having its free end pivotally connected to the piston rod 29 of an oscillating hydraulic cylinder 30. The crank 28 is fitted with a swingingly mounted pawl 32 by which the ratchet wheel 16 and the sprockets 14 are rotated a distance equal to the centre to centre distance between the V-shaped pockets 24.

Mounted upon a bed 34 is a hydraulically operated ram 35 preferably consisting of a horizontal stationary hollow piston rod 36 wihch is suitably supported in a standard block 37 and which is provided with hydraulic passages, not shown, and inlet outlet pipes 39 and 40 connected with a source of supply and return.

A cylinder 42 is provided for the hollow piston rod and is fitted with a plunger head 43 which is preferably triangular in cross section to conform to the channel or pocket 24 along which it is adapted to travel in thrusting a charge of lumber into the feed shoe 4 of the chipper 1.

Mounted above the ram 35 is a horizontal member 45 upon which valve controlling switches 46 and 47 are provided, which switches are adapted to control the flow of fluid through the pipes 39 and 40 whereby to cause the cylinder 42 to move towards the chipper to feed material thereto and to withdraw said cylinder and its plunger head 43 beyond the free end of the pocket 24. A vertical hydraulic cylinder 49 is supported above the pocket 24 facing the feed shoe 4. The piston 50 of said cylinder carries a cover plate 52 which extends above and lengthwise of said pocket. The cylinder is operated by a suitable control valve 53 which is adapted to be actuated to lower the cover plate 52 onto the material in the loading pocket 24 and prevent the displacement of the lumber within said pocket as it is being thrust into the chipper feed shoe. The supply of hydraulic fluid under pressure is adapted to be obtained from a pump 60 which is belt driven in any suitable way from the shaft 5 of the chipper 1 and means are provided of any suitable type, such as solenoid operated valves and the like for operating the several hydraulic devices under a desired sequence control. The control system contemplated is designed to be at rest with an empty pocket 24 in line with the feed shoe 4, the cylinder plunger head 43 is retracted beyond the free end of said pocket and the conveyor chains 12 locked against movement by the dog 26 in engagement with the notched wheel 25 and the cover plate 52 in raised position. When the chipper is set in motion and the control system set to function, the plunger head 43 will advance along the pocket 24 in timed relation to the knives passing the feed shoe of the chipper, such ratio being set to give a definite length of chip, as soon as the cylinder 42 reaches the end of the feeding stroke the switches 46 and 47 are actuated to cause the plunger head 43 to be returned to the position shown in Figure 1. As soon as the plunger head 43 is retracted to the position shown in Figure 1, the vertically movable dog 26, which is operatively carried by a piston 62 of a hydraulic cylinder or other reciprocatory device 63, is disengaged from the wheel 25 by its control valve 64 and immediately following this disengagement a control valve 65 causes the hydraulic cylinder 30 to function, moving its piston rod 29 to swing the crank 28 and the pawl 32 to turn the ratchet wheel 16 and the shafts 15 to move another V-shaped pocket 24 into alignment with the feed shoe 4.

The control set-up as here shown contemplates a constant development of fluid under pressure from the pump 60, which fluid is led to the electrically operated solenoid controlled valves in communication with the several operating cylinders. This control forms no part of the invention and it is not deemed necessary to describe or show the same in greater detail than in the diagram of Figure 3. During the feeding stroke of the plunger head 43, the next approaching V-shaped pocket 24 will be charged with one or more logs, or sundry pieces of short length lumber of any convenient dimension, so that as soon as the recently emptied pocket is removed from charge position and a following pocket has been moved to charge position, the plunger head 43 may be set in motion to feed the material to the chipper and the cover plate 52 will be depressed onto the lumber within the pocket to prevent the lateral displacement of any of the pieces forming the charge. Although it is intended to have the cover plate 52 automatically operated from the hydraulic fluid supply, it may be controlled by manual means if so desired. Since the fluid pump is driven directly from the drive shaft of the chipper it will be clearly seen that if the chipper slows down and makes a lesser than usual number of cuts per minute, the speed of the ram will be slowed down proportionately, hence the length of chips cut will always remain constant.

In operation of the conventional chipper set up in the conventional manner, it will be realized that as each chip length of wood is cut from the log, the rate of fall of the logs will get less on account of the reduction in log weight. In the present invention the work is moved progressively along a horizontal path, sliding upon a stationary plate member, the progression of the log is that which is required to give the desired chip length and present the edge of the log to another on-coming knife. The movement of the knives and log are so coordinated that the knife edges only encounter impact with the log, therefore, said knives can be of a greater hardness than those of the conventional pulp wood chipper and can be relied upon to remain effectively sharp several hours longer.

What I claim as my invention is:

1. A device for feeding pulp wood to a chipper comprising a horizontal conveyor having a pair of spaced chains, said chains being provided with collapsible elongated pockets, means for imparting movement to the chains and their pockets to progressively align the pockets one by one with a feed shoe of said chipper, each of said pockets being formed with spaced side plate members extending between the chains and being hingedly connected thereto, said members substantially contacting each other along one edge to form open-ended V-shaped trough-like pockets in which the pulp wood is carried.

2. A device for feeding pulp wood to a chipper comprising a horizontal conveyor having a pair of spaced chains, said chains being provided with collapsible elongated pockets, means for imparting movement to the chains and their pockets to progressively align the pockets one by one with a feed shoe of said chipper, each of said pockets being formed with spaced side plate members extending between the chains and being hingedly connected thereto, said members substantially contacting each other along one edge to form open-ended V-shaped trough-like pockets in which the pulp wood is carried, the free edges of the side plate members being hingedly connected to similar free edges of other side plate members mounted upon the chains.

3. In a pulp wood feeding device as claimed in claim 2, a cover plate mounted above the conveyor and the pocket which is aligned with the feed shoe of the chipper, and means for forcing the cover plate downwardly onto a load in the pocket to prevent lateral displacement of the pulp wood.

References Cited in the file of this patent

UNITED STATES PATENTS

| 8,069 | Gilliland | Apr. 29, 1851 |
| 1,411,706 | Bulley | Apr. 4, 1922 |
| 2,144,335 | Jensen et al. | Jan. 17, 1939 |
| 2,497,488 | Cashwell | Feb. 14, 1950 |
| 2,583,708 | Rose | Jan. 29, 1952 |
| 2,652,077 | Alexander | Sept. 15, 1953 |
| 2,722,305 | McCabe | Nov. 1, 1955 |

FOREIGN PATENTS

| 230,540 | Switzerland | Apr. 1, 1944 |
| 841,642 | Germany | June 19, 1952 |